United States Patent
Arthurs et al.

(10) Patent No.: US 7,772,136 B2
(45) Date of Patent: *Aug. 10, 2010

(54) ANTI-SLIP ROOFING UNDERLAYMENT

(75) Inventors: Trevor Arthurs, Truro (CA); Kathleen English, Pictou (CA)

(73) Assignee: Intertape Polymer Corp., Bradenton, FL (US)

( * ) Notice: Subject to any disclaimer, the term of this patent is extended or adjusted under 35 U.S.C. 154(b) by 613 days.

This patent is subject to a terminal disclaimer.

(21) Appl. No.: 11/639,650

(22) Filed: Dec. 15, 2006

(65) Prior Publication Data

US 2008/0141604 A1     Jun. 19, 2008

(51) Int. Cl.
*B32B 27/12* (2006.01)
*B32B 27/04* (2006.01)

(52) U.S. Cl. .............................. 442/2; 442/43; 442/44; 442/45; 442/46; 442/49; 442/50; 442/58

(58) Field of Classification Search .................... 442/2, 442/43, 44, 45, 46, 49, 50, 58
See application file for complete search history.

(56) References Cited

U.S. PATENT DOCUMENTS 6,925,766 B2 * 8/2005 Di Pede ....................... 52/408

2008/0289289 A1 * 11/2008 Wiercinski et al. ....... 52/745.06

OTHER PUBLICATIONS

C. E. Shepherd Company, Houston, TX. Product information sheet—Diamond Pattern 92 Gauge Embossed Polyester Film. www.ceshepherd.com.

C. E. Shepherd Company, Houston, TX. Product information sheet—Diamond Pattern 142 Gauge Embossed Polyester Film. www.ceshepherd.com.

* cited by examiner

*Primary Examiner*—Ula C Ruddock
(74) *Attorney, Agent, or Firm*—The Marbury Law Group PLLC

(57) ABSTRACT

A roofing underlayment comprises a reinforcing layer, which is extrusion coated on at least one side with an anti-slip coating layer. Preferably, the reinforcing layer comprises a woven polyethylene or polypropylene scrim. The anti-slip coating layer comprises a compound based on a styrene and ethylene/butylene-styrene, S-E/B-S, block copolymer, such as the compound sold under the trademark KRATON® MD6649. The anti-slip coating layer is low in cost and helps prevent water from penetrating the primary roofing material. In addition, the anti-slip coating layer provides an improved anti-skid surface upon which an individual may safely walk.

6 Claims, No Drawings

ANTI-SLIP ROOFING UNDERLAYMENT

BACKGROUND

The present invention relates to a roofing material and more particularly to a roofing underlayment including anti-slip properties.

In both residential and commercial roofing applications, a roof covering material is utilized to provide the main water protection barrier. Whether the primary roof covering material comprises composition shingles, metal panels or shingles, concrete or clay tiles, wood shakes, or slate, a primary roof covering material is used to protect the building interior from water ingress.

Roofing underlayment is sometimes described as Type I and Type II roofing underlayments as specified in Chapter 15 of the IBC (International Building Code), and defined in Chapter 9 of the IRC (International Residential Code); and is also specified as Type 15 and Type 30 underlayments in Chapter 15 of the UBC (Uniform Building Code). The present invention will find utility as potential substitutes for these underlayment types, or simply as a useful underlayment in various roofing construction projects.

In some circumstances, whether due to primary roofing material design, installation practices, or accidental breach of the primary roofing material, water can penetrate the primary roofing material. To protect the building interior in these circumstances, it is common to provide a secondary layer called a roofing underlayment, beneath the primary layer. The roofing underlayment acts as a water and moisture barrier.

A variety of roofing underlayment products is commonly used. The two major classes are mechanically attached and self-adhered underlayments, the latter commonly referred to as "peel and stick".

It is desirable that a roofing underlayment provide a surface which has a sufficiently high coefficient of friction ("COF") to increase the safety for an applicator to walk upon. The coefficient of friction describes the ratio of the force of friction between two bodies and the force pressing them together. The coefficient of friction is an experimentally determined value. The phrase "high coefficient of friction" in this document means a sliding coefficient of friction of at least 0.5 when tested with dry leather and at least 0.7 when tested with dry rubber (per CAN/CGSB-75.1-M88).

Underlayments should be easily affixable to a roofing surface, for example by nailing or adhesion. They should ideally be impermeable to moisture. High tensile and tear strengths are also desirable to reduce tearing during application and exposure to high winds. Underlayments should be light in weight to facilitate ease of transport and application, and should be able to withstand prolonged exposure to sunlight, air and water.

A common mechanically attached roofing underlayment product used in the United States and Europe is bituminous asphalt-based felt, commonly referred to as "felt." Typically, this felt comprises paper felt saturated with asphaltic resins to produce a continuous sheeting material which is processed into short rolls for application.

Such felts generally demonstrate good resistance to water ingress and good walkability in dry and wet roof conditions. Disadvantages include very low tensile and tear strengths, relatively high weight per unit surface area, a propensity to dry and crack over time, very low resistance to ultraviolet ("UV") exposure, high likelihood of wind blow off, and a propensity to absorb water causing buckling and wrinkling, thus preventing the application of direct primary roofing materials such as composition shingles.

To overcome these shortcomings, several products have been marketed with high tensile and tear strengths. These materials are generally reinforced non-woven polymeric synthetic materials, rather than asphaltic felts. They are generally lightweight, thin, have higher tensile, tear and burst strengths as compared to felts, and are superior to felts in UV resistance and resistance to drying and cracking over time.

A major drawback of these polymer underlayments is their low COF on the walking surface in dry or wet conditions. This problem limits the commercial attractiveness of such products in high pitch roofs or in climates characterized by frequent and sporadic wet or humid conditions. Thus, a roofing underlayment made from a polymer material which also provides anti-skid properties would be ideal for use in a roofing membrane.

SUMMARY OF THE INVENTION

A roofing underlayment according to one aspect of the present invention comprises a reinforcing layer, which is extrusion coated on at least one side with an anti-slip coating layer. In one embodiment, the reinforcing layer comprises a woven polyethylene or polypropylene scrim. The anti-slip coating layer comprises a compound based on a styrene and ethylene/butylene-styrene, S-E/B-S, block copolymer, such as the compound sold under the trademark KRATON® MD6649. The anti-slip coating layer is low in cost and helps prevent water from penetrating the primary roofing material. In addition, the anti-slip coating layer provides an improved anti-skid surface upon which an individual may safely walk.

It is an aspect of the present invention to provide a roofing underlayment having anti-slip properties.

It is another aspect of the present invention to provide a roofing underlayment which comprises a polypropylene woven scrim.

It is yet another aspect of the present invention to provide a roofing underlayment with improved properties that is low in cost.

DESCRIPTION OF THE INVENTION

An embodiment of the present invention is directed toward a roofing underlayment which provides an improved anti-slip surface. The roofing underlayment of the present invention comprises a reinforcing layer and one or more coating layers disposed on at least one surface of the reinforcing layer.

In one embodiment, the reinforcing layer is a woven fabric. The fabric or scrim is preferably made from polyolefin materials such as polyethylene, polypropylene, copolymers and other combinations thereof. Preferably the scrim is made from polypropylene or polyethylene based polymers. In one preferred embodiment, the scrim is made from polypropylene film material and comprises 11 tapes per inch of a 875 denier polypropylene tape in the warp direction and 5.8 tapes per inch of a 1250 denier polypropylene tape in the weft direction.

In an alternative embodiment, the reinforcing layer comprises a nonwoven fabric.

The scrim can be coated on one or both sides. At least one coating layer comprises an anti-slip coating layer. The anti-slip coating layer comprises a compound based on a styrene and ethylene/butylene, S-E/B-S, block copolymer. In one embodiment the anti-slip layer comprises a compound based on a styrene and ethylene/butylene, S-E/B-S block copolymer, comprising from about 30%-75% by weight styrene-ethylene/butylene-styrene block copolymer, from about 0%-50% by weight resin, and from about 0.1%-2% by weight antioxidant/stabilizer/dusting agent. One such suitable S-E/B-S based compound is KRATON® MD6649 compound manufactured by KRATON Polymers, referred to hereafter as "KRATON 6649". The anti-slip coating layer may additionally comprise KRATON® G1730M compound, referred to hereafter as "KRATON 1730". It has been found surprisingly, that the anti-slip coating layer provides anti-skid properties to the roofing underlayment and also maintains tack when water is applied to the surface of the underlayment.

The smooth coating allows water run-off to prevent water build-up under the feet of an individual walking on the surface of the underlayment.

Preferably, high melt flow temperature, low modulus, thermoplastic olefin resins are also used for the coatings of the present invention. Suitable polyolefins include, but are not limited to, low density polyethylene (LDPE), linear low density polyethylene (LLDPE), and polypropylene (PP). Polyolefin coatings are selected to be compatible with the woven scrim to which they are applied. Preferred polyolefin resins include Adflex KS084P olefin resins manufactured by Basell Service Company B.V ("Basell") and based on material produced from Basell's proprietary "Catalloy" process.

The coatings of the present invention are suitable for extrusion coating onto scrim. Extrusion coating of a layer of scrim may be accomplished by melting the coating in an extruder and extruding through a film die onto the scrim. The molten polymer and scrim are transported between a nip roll and a chill roll to cool the molten coatings. A chill roll temperature of 45° F. to 85° F. is commonly used.

Preferably, the roofing underlayment of the present invention comprises a scrim that is coated on both upper and lower surfaces. The upper surface coating has a thickness of approximately 0.5 mils to 4 mils, preferably 1.5 mils. The lower surface coating has a thickness of approximately 0.5 to 4 mils, preferably 1.2 mils. In one embodiment the upper surface coating comprises two layers, a core layer and a skin layer. The core layer and skin layer are co-extruded onto the scrim. The skin layer comprises an S-E/B-S block copolymer such as Kraton MD6649, another polyolefin resin such as LDPE, or h-PP plus UV, a pigment (colour), and anti-block. The core layer comprises polyolefin resins such as LDPE and h-PP, plus UV, and a pigment (colour). The lower surface comprises only one layer of coating. The lower surface coating layer comprises polyolefin resins such as Adflex KS084P and LDPE, antiblock, UV, and pigment (colour). While the upper surface coating can be a single anti-slip coating layer, co-extrusion of the skin and core layers, as described, allows Kraton to be used only where necessary.

The coatings may comprise other additives including, for example, U.V. stabilizers (including Tinuvin® 328 and Chimassorb® 944, both are registered trademarks of, and supplied by Ciba-Geigy Corporation, NY, Ampacet Corporation UV100, based on Ciba Specialty Chemical's proprietary Shelfplus®), antiblock additives, colorants, and pigments, to the extent that such additives do not interfere with the anti-skid properties of the coatings.

When used, pigments and colorants are preferably added as part of a color masterbatch. The color masterbatch is formed by combining the pigments (colorant) with a polypropylene and/or polyethylene carrier compatible with the polyolefin coatings. In general, compatible carriers can be determined by creating extruded melt blends and testing for phase separation in the extrudate.

Table 1 provides the coefficient of friction values obtained after slip resistance testing in accordance with CAN/CGSB-75.1-M88 was conducted on the roofing underlayment of the present invention.

TABLE 1

| Test Description | Test Method | Test Result | Requirement | Pass/Fail |
|---|---|---|---|---|
| Leather Boot (dry) | | | | |
| Machine Direction | | 0.93 | | |
| Cross Direction | | 0.85 | | |
| Leather Boot (wet) | | | | |
| Machine Direction | | 0.72 | | |
| Cross Direction | | 0.76 | | |
| Rubber Boot (dry) | | | | |
| Machine Direction | | 1.25 | | |
| Cross Direction | | 1.18 | | |
| Rubber Boot (wet) | | | | |
| Machine Direction | | 1.56 | | |
| Cross Direction | | 1.53 | | |

The invention is illustrated, but not limited by the following examples: which follow. It should be noted that the color of pigment included in the coatings can vary, as long as the percentage of the resin, or the let-down-ratio, remains the substantially the same.

EXAMPLES

Example 1

A roofing underlayment according to the present invention comprised a woven polypropylene scrim. The scrim comprised upper and lower coating layers corresponding with upper and lower surfaces of the scrim. The polypropylene scrim used was a woven polypropylene with 11.0×5.8 tapes per inch. The upper surface of the scrim was coated first. The upper coating layer was comprised of a first upper layer, or core layer and a second upper layer, or skin layer. The core layer comprised 70% by weight of the upper coating layer. The skin layer comprised 30% by weight of the upper coating layer. The core layer comprised 2% UV100 (UV MasterBatch), 10% Beige 889822 (pigment), 4% AB1500 (anti-block), 20% LDPE (low density polyethylene), and 64% h-PP (homo-polymer polypropylene). The skin layer comprised 2% UV100 (UV MasterBatch), 10% Beige 889822 (pigment), 8% AB1500 (anti-block), 15% LDPE (low density polyethylene), and 65% KRATON® MD6649 compound (S-E/B-S block copolymer). The melt temperature range of the upper coating layer was between 450° F. to 550° F. Minimum chill roll temperatures varied between 45° F. and 85° F.

The lower coating layer comprised 73.5% KS084P (thermoplastic olefin resin), 8.0% LDPE (low density polyethylene), 2% UV100 (UV MasterBatch), 10.5% White MB (70% TiO2 Pigment and 30% polyethylene), 6% AB 1500 (anti-block). The melt temperature range of the lower coating layer was between 490° F. to 550° F. The melt temperature range of the upper coating layer was between 450° F. and 550° F. Chill roll temperatures varied between 45° F. and 85° F.

Example 2

A second roofing underlayment according to the present invention comprised a woven polypropylene scrim. The scrim comprised upper and lower coating layers corresponding with upper and lower surfaces of the scrim. The polypropylene scrim used was a woven polypropylene with 11.0×5.8 tapes per inch. The upper surface of the scrim was coated first.

Upper coating layer was comprised of a first upper layer, or core layer and a second upper layer, or skin layer. The core layer comprised 70% by weight of the upper coating layer. The skin layer comprised 30% by weight of the upper coating layer. The core layer comprised 1% UV100 (UV MasterBatch), 10% Beige 889822 (pigment), 8% LDPE (low density polyethylene), and 81% h-PP (homo-polymer polypropylene). The skin layer comprised 2% UV100 (UV MasterBatch), 10% Beige 889822 (pigment), 8% AB1500 (antiblock), 10% h-PP (homo-polymer polypropylene), and 70% KRATON® MD6649 compound (S-E/B-S block copolymer). It should be noted that the amount of h-PP in the skin layer varies from about 5% to about 20% based on chill roll sticking, adhesion, and tack. The amount of KRATON® MD6649 compound can also be varied based on the amount of h-PP. Typically MD 6649 could range from 30% to 90%. The melt temperature range of the upper coating layer was between 450° F. to 550° F. Chill roll temperatures varied between 45° F. and 85° F.

Lower coating layer comprised 73.5% KS084P (thermoplastic olefin resin), 8.0% LDPE (low density polyethylene), 2% UV100 (UV MasterBatch), 10.5% White MB (70% TiO2 Pigment and 30% polyethylene), 6% AB 1500 (anti-block). The trial was run using standard polypropylene conditions. The melt temperature range of the lower coating layer was between 490° F. to 550° F. The melt temperature range of the upper coating layer was between 450° F. to 550° F. Chill roll temperatures varied between 45° F. and 85° F.

Typical characteristics of the S-E/B-S block copolymer (KRATON® MD6649 compound) used in the present invention are provided in Table 2.

TABLE 2

| Property | Test Method | Example Specification Range/Value |
|---|---|---|
| Antioxidant content | KM08 | 0.1-0.3% mass |
| Melt Flow Rate (190° C./2.16 kg) | ISO 1133 | 13-19 g/10 min |
| Bulk Density | BAM 931 | 2-3 g/100 pellets |
| Hardness [a] | ASTM 2240 | 34-42 Shore A (30 s) |
| Specific gravity | ISO 2781 | 0.91 Mg/m³ |
| Particulate matter index | BAM 903 | A |
| Yellowness index | BAM 1015 | <5 |

Typical characteristics of the thermoplastic olefin resin (Adflex KS084P) used in the present invention are provided in Table 3.

TABLE 3

| Property | Test Method | Example Specification Range |
|---|---|---|
| Density | ASTM D 792 | 0.88 g/cm³ |
| Melt Flow Rate (230° C.) | ASTM D 1238 | 30 g/10 min |
| Tensile Strength @ Yield | ASTM D 638 | 6 MPa |
| Flexural Modulus | ASTM D 790 | 110 MPa |
| Tensile Elongation @ Yld | ASTM D 638 | 23% |
| Tensile Elongation @ Brk | ASTM D 638 | 670% |
| Notched izod impact (23° C.) | ASTM D 256 | No Break |
| Durometer Hardness (Shore D) | ASTM D 2240 | 44 |

A roofing underlayment has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A roofing underlayment comprising:
a reinforcing layer comprising:
an upper surface anti-slip coating layer comprising:
a core layer comprising 2% UV stabilizer, 10% Beige pigment, 4% anti-block, 20% low density polyethylene, and 64% h-homopolymer polypropylene; and
a skin layer comprising 2% UV stabilizer, 10% Beige pigment, 8% anti-block, 15% low density polyethylene, and 65% S-E/B-S block copolymer compound comprising about 30%-75% by weight styrene-ethylene/butylene-styrene, about 0%-50% by weight resin, and about 0.1%-2% by weight antioxidant/stabilizer/dusting agent; and
a lower surface anti-slip coating layer comprising 73.5% thermoplastic olefin resin, 8.0% low density polyethylene, 2% UV stabilizer, 10.5% white masterbatch, and 6% anti-block;
wherein the anti-slip coating comprises a styrene and ethylene/butylene-styrene (S-E/B-S) block copolymer,
wherein the upper surface anti-slip coating layer has a thickness of about 0.5 mils to 4 mils,
wherein the lower surface anti-slip coating layer has a thickness of about 0.5 mils to 4 mils, and
wherein the roofing underlayment is embossed with a pattern.

2. The roofing underlayment according to claim 1, wherein the reinforcing layer comprises a woven polyethylene scrim.

3. The roofing underlayment according to claim 1, wherein the reinforcing layer comprises a woven polypropylene scrim.

4. The roofing underlayment according to claim 1, wherein the reinforcing layer comprises a nonwoven layer.

5. The roofing underlayment according to claim 1, wherein:
the reinforcing layer comprises a woven polypropylene scrim;
wherein the core layer and the skin layer are coextruded onto the scrim; and wherein the core layer comprises 70% by weight of the upper coating layer and the skin layer comprises 30% by weight of the upper coating layer.

6. A roofing underlayment comprising:
a reinforcing layer comprising:
an upper surface anti-slip coating layer comprising:
a core layer comprising 2% UV stabilizer, 10% Beige pigment, 4% anti-block, 20% low density polyethylene, and 64% h-homopolymer polypropylene; and
a skin layer comprising 2% UV stabilizer, 10% Beige pigment, 8% anti-block, 15% low density polyethylene, and 65% S-E/B-S block copolymer compound comprising about 30%-75% by weight styrene-ethylene/butylene-styrene, about 0%-50% by weight resin, and about 0.1%-2% by weight antioxidant/stabilizer/dusting agent; and a lower surface anti-slip coating layer comprising 73.5% thermoplastic olefin resin, 8.0% low density polyethylene, 2% UV stabilizer, 10.5% white masterbatch, and 6% anti-block;

wherein the anti-slip coating comprises a styrene and ethylene/butylene-styrene (S-E/B-S) block copolymer, wherein the upper surface anti-slip coating layer has a thickness of about 0.5 mils to 4 mils;

wherein the lower surface anti-slip coating layer has a thickness of about 0.5 mils to 4 mils; and wherein the roofing underlayment is embossed with a pattern;

wherein the reinforcing layer comprises a woven polypropylene scrim;

wherein the core layer and the skin layer are coextruded onto the scrim; and wherein the core layer comprises 70% by weight of the upper coating layer and the skin layer comprises 30% by weight of the upper coating layer.

* * * * *